Jan. 19, 1960 W. E. ESTELLE 2,922,105
CONDUCTIVITY CELL
Filed Nov. 5, 1953 2 Sheets-Sheet 1

INVENTOR
Weems E. Estelle
BY Peck & Peck
ATTORNEYS

Jan. 19, 1960    W. E. ESTELLE    2,922,105
CONDUCTIVITY CELL
Filed Nov. 5, 1953    2 Sheets-Sheet 2
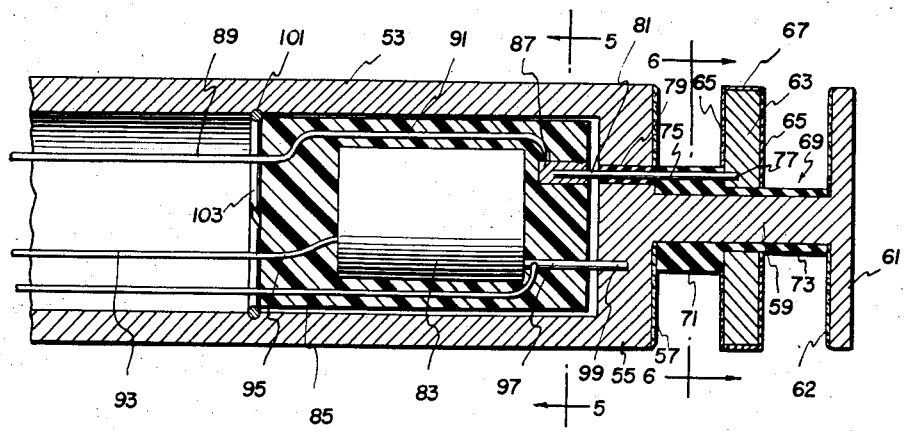
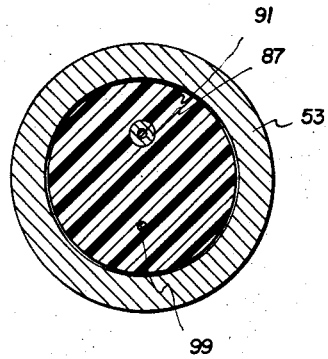
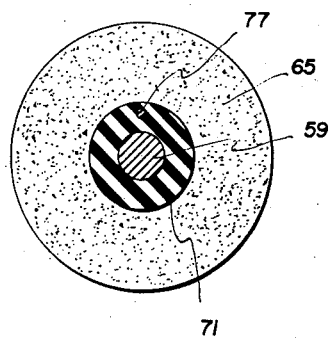
INVENTOR
Weems E. Estelle
BY
Peck & Peck
ATTORNEYS

United States Patent Office 2,922,105

Patented Jan. 19, 1960

2,922,105
CONDUCTIVITY CELL

Weems E. Estelle, Annapolis, Md., assignor, by mesne assignments, to McNab, Incorporated, New York, N.Y., a corporation of New York Application November 5, 1953, Serial No. 390,348

4 Claims. (Cl. 324—30)

This invention relates broadly to the art of measuring the electrical conductivity of liquids resulting from contamination by electrical conducting impurities, and in its more specific aspects it relates to a conductivity cell of the smallest practicable size which will permit correct system operation for accurately testing and indicating the concentration of impurities in the liquid under test; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

This invention is concerned with conductivity cells of the broad type of those disclosed in a patent application filed on January 23, 1953, by me and Kenneth F. Channon, Jr., Serial No. 332,982, now Patent No. 2,780,773, and involves novel types of conductivity cells particularly adapted for use in and with relatively small diameter liquid flow conduits where the dimensional characteristics of the cell must be substantially reduced relative to those characteristics of the cell disclosed in the aforesaid patent application. Such reduction in size has presented certain problems which the conductivity cells of the present invention have solved.

Conductivity cells of this character have been designed mainly for use in measuring and indicating the concentration of salt in water flowing through conduits to boilers, engines, condensers and the like on ships although it is adapted for use in other fields for indicating the concentration of electrical conductive impurities in various solutions. The cells include electrodes which in operative testing position are inserted into the liquid flow line or the liquid tank for immersion in the liquid under test for flow of the liquid between the electrodes and in full contact therewith. Thus, it is generally advantageous to provide a maximum electrode area for contact with the liquid while retaining an electrode separation permitting a reasonable flow of liquid through the cell. In the operation of a conductivity cell an electric potential is impressed on the immersed electrodes and current flows therebetween in accordance with the conductivity of the liquid.

I have provided reduced size conductivity cells which provide maximum electrode area by utilizing disc type circular electrodes so mounted that both sides of the "hot" or electrically charged electrode are operatively positioned not only for contact with the liquid but also to generate a conduction field with one or more ground electrodes. By this unique arrangement I have doubled the area for an electrode of a given diameter and have provided a desirable electrode separation.

The type of cell which I have evolved permits an easy flow of liquid between the electrodes which is necessary to minimize polarization effects, and it inherently provides a substantially uniform field between the electrodes.

The conductivity cell while of small size has been designed to and will withstand high pressures, is rugged and is temperature compensated, which is not the case with respect to laboratory type cells which may be comparable in size.

Because of the reduced size of the conductivity cell of this invention and its rugged characteristics it is adapted for portable use.

In producing one form of reduced size or miniature cell I have provided a unit adapted for easy assembly, disassembly and adjustment, and one which may be economically produced.

The reduced size conductivity cells of this invention include a plurality of electrodes mounted and relatively arranged so that the current density on the electrodes may be held below a certain value, if this is not the case the cell constant becomes a function of the solution conductivity which in turn would not permit correct system operation. If the cell current is too small the indicating meter, which is an element of the entire system of which the conductivity cell is a part, cannot be operated directly.

Conductivity cells of the class with which I am particularly concerned include a compensator or thermistor which functions as a temperature compensating element which is so mounted that it is subjected to substantially the same temperatures as the electrodes of the cell. In many conductivity cells the compensator is mounted within a housing in a body of silicone oil which is a good heat transfer agent. In one from of my invention I mould the compensator in a plastic which is a better conductor of heat than silicone oil. One of my objects has been to so form and construct the compensator and its casing which is made of a good heat transfer agent so it can be removed from and positioned within the housing of the cell with the utmost facility and have therefore overcome certain disadvantages which are inherent in cells using silicone oil for mounting the compensator and as a heat transfer agent.

The conductivity cells of this invention have been designed to facilitate the cleaning of the plurality of electrodes as assembled. This represents a substantial advantage over many known types of electrodes and electrode mounting arrangements where cleaning the electrodes presents a considerable problem.

It has been one of my purposes to provide a conductivity cell in which the ground electrodes and the housing of the cell are an integral unit so that economies of production and assembly with the compensator are realized.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 4 is a view in longitudinal section of a further form of conductivity cell.

Fig. 5 is a view taken on line 5—5 of Fig. 4.

Fig. 6 is a view taken on line 6—6 of Fig. 4.

Figure 1:
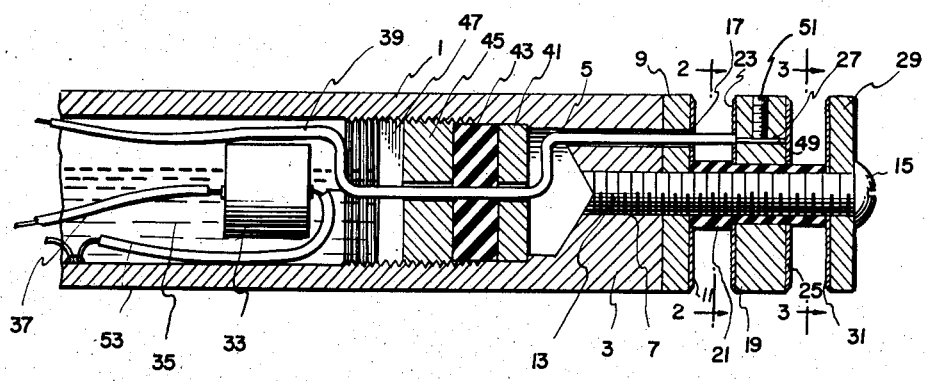
Fig. 1 is a view in longitudinal section of one form of conductivity cell.
Figure 2:
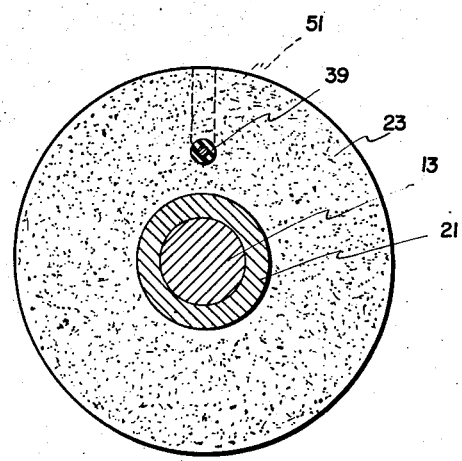
Fig. 2 is a view taken on line 2—2 of Fig. 1.
Figure 3:
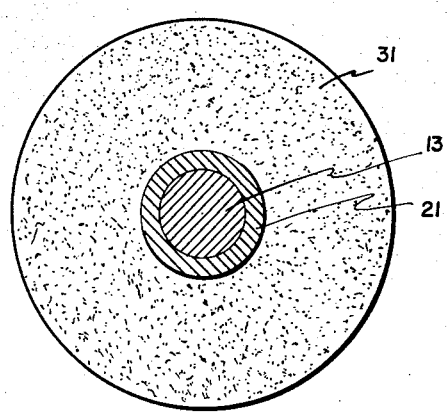
Fig. 3 is a view taken on line 3—3 of Fig. 1.

In Figs. 1 through 3 of the drawings I have illustrated one form of my invention and have used the numeral 1 to designate the housing of the conductivity cell. The housing 1 is preferably made of brass or other suitable electric conductive material and, as will become apparent as this detailed description proceeds, constitutes the mounting and supporting means for the electrodes and also houses the compensator of the cell. The housing may be supported and mounted in any suitable manner so that it will project through a fitting or the like in a liquid flow conduit or a tank in such manner that the electrodes of the conductivity cell will be projected into and immersed in the liquid under test. At its forward end the housing may be formed with a solid body portion 3 having a longitudinally extending slot 5 therethrough and a central threaded screw receiving opening 7.

I provide an inner ground electrode 9 of circular form providing a disc element having its outer operative face coated with platinum or the like 11. The inner electrode is formed with a central opening through which extends an electrode mounting screw 13 having a head 15, the screw in operative position being threaded in the hole 7 of body 3 of the housing and supportedly mounts the electrode 9 in electrical contact therewith. The electrode 9 is provided with a hole or slot 17 extending therethrough which is in alignment with slot 5 when the electrode is operatively mounted on the screw and may be soldered or otherwise fixed to the forward face of body 3 of the housing.

The electrically charged or "hot" electrode of the electrode assembly is designated by the numeral 19 and is of circular disc-like configuration and may be of equal diameter to the inner or ground electrode 9. This electrode 19 is formed with a central opening therethrough of greater diameter than the screw 13 which extends through the opening and mounts electrode 19 in spaced relation to the inner ground electrode 9. The "hot" or electrically charged electrode while being mounted on the supported by the electrode supporting screw 13 is insulated therefrom by an insulating sleeve 21 which extends from operative face of electrode 9 and encases a major portion of the length of the screw and extends through electrode 19 between it and the screw. The electrode 19 is provided with an inner platinum coated surface 23 electrically co-active with the operative coated face of electrode 9 and with an outer platinum coated surface 25 which is electrically coactive with the operative face of a further outer electrode about to be described. I provide a slot 27 in the electrically charged electrode which is in alignment with slot 17 in electrode 9 when the electrodes are operatively mounted on the electrode mounting screw. The purpose of this slot will become apparent as this description proceeds.

I provide an additional ground electrode 29 of circular disc-like configuration which may be of substantially the same diameter as hereinbefore described electrodes 9 and 19 and is mounted on the free end of electrode supporting screw 13 which extends through a central aperture in the electrode, the electrode being maintained in position on the outer end of the screw by means of head 15 in spaced relation relative to the electrically charged electrode 29. The outer ground electrode 29 is in electrical contact with the screw 13 and is provided with an operative platinum coated face 31 directed toward face 25 of electrode 19 for electrical co-action therewith. Consideration of the drawings discloses that the inner face of electrode 29 abuts against the outer end of insulating sleeve 21.

Positioned within the housing 1 is a compensator or thermistor 33 serving as a temperature compensating unit, the compensator may be floating in a body of a heat transfer agent such as silicone oil 35 and the rear end of the housing may be closed or sealed in any suitable manner to maintain the oil within the housing.

The electrical circuit within the conductivity cell includes an insulated wire compensator lead 37, and an insulated wire lead 39 connecting the source of the current to the "hot" or electrically charged electrode 19. Within the forward portion of the housing I provide means for sealing the interior of the housing against escape of the oil forwardly from the housing and against entry of the liquid under test into the housing. Such means includes a washer 41, a grommet 43 and a retaining plug 45 provided with a screw driver slot 47, the plug being threadedly associated with the housing. The lead 39 extends through openings in the plug and washer and also extends through the grommet which is compressed about the wire lead to form a liquid tight seal therewith. The lead extends from the washer through opening 5 in body 3 and slot 17 in the electrode 9 and across the space between electrodes 9 and 19. At its forward end the insulation is stripped from lead 39 as at 49 and this wire is inserted in hole 27 which is provided in the electrically charged electrode 19 and is removably maintained therein in electrical contact with the electrode by means of a set screw 51. It will be apparent that the cable 39 connects the electrically charged electrode into the electric circuit.

The ground electrodes 9 and 29 are both in electrical contact with the electrode supporting screw 13 which in turn is in electrical contact with body 3. The ground lead thus includes the housing with which the insulated wire 53 may be electrically associated as at 53'.

It may be pointed out that the electrically charged or "hot" electrode 19 which is the center electrode in the electrode assembly may be made of titanium, and since it is very difficult to solder or braze to titanium I have made this electrode of greater thickness in order to accommodate a set screw 51 of reasonable dimensions.

It will now be appreciated that I have produced a cell which may be of substantially reduced size relative to cells heretofore known and in use and I have successfully accomplished this by providing the maximum electrode area with the "hot" or electrically charged electrode having two electrically operative surfaces in contact with the liquid under test and a ground electrode for each operative surface of the electrically charged electrode. Thus, in this unique cell and electrode assembly the liquid under test flows between electrodes 9 and 19 and 29 and 19 in contact with the two operative faces or surfaces of the electrically charged electrode and in contact with each operative face of the two ground electrodes to thereby generate two conduction fields, one between face 23 of electrode 19 and face 11 of electrode 9 and the other between face 25 of electrode 19 and face 31 of electrode 29. The electrodes in this assembly are spacedly mounted to permit the desirable flow of liquid therebetween.

The electrodes, if physically damaged, may be easily and quickly replaced by removing the screw 13 so that assembly and disassembly of the unit is provided for.

In Figs. 4 through 6 of the drawings I have illustrated a modified form of reduced size conductivity cell which has been designed for generally the same uses and to overcome generally similar problems which have been solved by the cell disclosed in Figs. 1 through 3 of the drawings.

I provide a cylindrical housing section 53 which may be formed of brass or other suitable electrical conductive material. The housing 53 is formed with a thickened forward electrode forming wall 55 having a coating of platinum 57 applied to its outer operative surface. An integrally formed post 59 of brass or other suitable electrical conductive metal projects forwardly from the electrode forming wall 55 of housing 53 and at its forward or outer end is formed with an electrode forming circular disc 61 thereon, the inner surface of the electrode 61 being coated with platinum or the like 62. The circular electrode 61 being preferably of substantially the same diameter as the housing electrode forming end wall 55.

Intermediate the ground electrodes 55 and 61 I mount a "hot" or electrically charged electrode 63 which is mounted on and supported by the projecting post 59. The electrically charged electrode 63 is of circular disc like configuration and is preferably of substantially the same diameter as the outer ground electrode 61. This center or electrically charged electrode 63 has its two opposite circular faces coated with platinum or the like suitable material 65. I may also if found desirable and advantageous coat the annular periphery of the electrode 63 with an insulating material 67. The electrically charged electrode 63 may be split to provide two segments for facilitating the mounting thereof on the post 59, the electrode being fixed in mounted position on said post by any suitable means such as a clamp fastened about the periphery thereof or in other ways as will be readily apparent to one skilled in the art.

The projecting post 59 is sheathed or encased throughout its length by an insulating sleeve designated generally by the numeral 69. The inner length of this sleeve which extends between the platinum covered operative face 57 of the electrode forming wall 55 and face 65 of electrode 63 is radially thickened as at 71 relative to that portion 73 of the insulating sleeve 69 which extends forwardly from the thickened portion thereof through an opening in the center electrode 63 to thereby insulate said electrode from the projecting metallic post.

I provide a wire lead 75 which extends into an opening provided in the center electrode 63 as at 77 so that the lead may be soldered or otherwise electrically connected to said electrode. This wire lead extends through the radially thickened portion 71 of the sleeve 69 and in sealed relation thereto, and the lead extends rearwardly through the electrode forming wall 55 and the operative face 57 thereof and is encased and sealed within an insulating jacket 79 so that the opening through the electrode forming wall 55 and its operative face 57 is effectively sealed against entry of liquid thereinto and the lead is insulated from the electrode forming wall 55. The rearward end 81 of the lead for the electrically charged electrode 63 projects rearwardly beyond the rear wall of electrode forming wall 55 for a purpose to be hereinafter explained.

In this form of my invention I have devised a highly advantageous compensator or thermistor mounting arrangement to provide for easy removal of the compensator from its operative position within the housing 53 and to also provide for the necessary heat conduction to the compensator so that it will operate efficiently and function properly in the entire indicating apparatus.

The compensator is designated by the numeral 83 and this compensator is disposed within a plastic jacket or casing 85 which is molded thereabout to provide a compact unitary body. The plastic forming the casing 85 for the compensator 83 is one having good heat conduction characteristics, and one example of such a plastic is an epoxy resin which is a substantially better heat transfer agent than is silicone oil which is now commonly used with compensators in conductivity cells. The dimensions of the plastic casing or body 85 are such that the entire unit involving the enclosed compensator 83 and its plastic case 85 have a sliding fit within the housing and will snugly fit within the housing 53 for removal therefrom when necessary. The plastic casing 85 is provided with a pin receiving electric connector socket 87 extending inwardly a distance from the forward surface of the plastic body. An electrical lead 89 extends from the electric circuit of the system through the housing and is molded within the plastic body 85 as at 91 to extend therethrough to make an electrical contact with the electric connector socket 87. It will now be apparent that the compensator unit when operatively disposed in the housing will be in such position that projecting pin portion 81 of lead 75 will project into the electric socket 87 to thereby connect electrode 63 into the electric circuit. A compensator lead 93 extends through the housing and is molded within the plastic case as at 95 to connect the compensator into the circuit. The compensator is electrically connected to the ground electrodes 55 and 61 by means of a pin connection 97 which extends forwardly from the compensator and through the plastic body for removable seating as at 99 in a recess which is formed in the ground or electrode forming wall 55 for electrical contact therewith. The pin may, if desired, be soldered in the recess. I preferably provide a circumferential groove 101 which is formed in the interior surface of the housing 53 at a point thereon adjacent the rearward end of the plastic body 85 and in order to maintain the compensator unit in operative position removably disposed within the housing, a retaining ring 103 is snapped into the groove 101 for engagement against the rear wall of the compensator unit.

It will be appreciated that I have evolved a conductivity cell assembly in which at least two of the electrodes and the housing in which the compensator unit is mounted are formed as an integral unit and these electrodes are not replaceable. It will also be apparent that the electrode arrangement and mounting is such that the electrodes may be readily cleaned. The conductivity cell of this invention has been prepared for normal usage in which there will be no real physical deterioration of the electrodes. However, it is within my contemplation to form the outer ground electrode as a separate mounted unit such as the electrode 29 disclosed in Fig. 1 of the drawings if in certain installations it is found desirable to do so.

The conductivity cells disclosed and described herein are particularly adapted for use with a valve arrangement which has been designed and made adaptable for combination with conductivity cells of this general character. In such valves the conductivity cell assembly is mounted within a tubular valve stem and since it is necessary to retain a uniform field pattern between the three electrodes of the electrode assemblies it is desirable to prevent conduction between the electrically charged electrode and the valve which would upset the conduction field or uniform field pattern between the electrodes. It is within my contemplation to apply an insulating coating to that portion of the interior wall of the tubular valve stem which is adjacent the electrodes in order to eliminate any conduction between the electrodes and the valve. Since the conductivity cell assemblies as illustrated and described herein may be used with other type valve assemblies, I may coat the periphery of the electrically charged electrode 63 with an insulating coating 67 which will prevent conduction between any metallic mounting means, such as a valve which may be closely adjacent to these electrodes.

The functions and purposes of the mounting arrangement and assembly of the three electrodes in Figs. 4 through 6 is substantially the same as for the cell assembly illustrated in Figs. 1 through 3 of the drawings. In this form of the invention it has been my purpose to again produce a cell of the smallest practical size having a maximum electrode area while retaining an electrode separation that will permit a reasonable flow of liquid through the cell. In other words, in the embodiment illustrated in Figs. 4 through 6 as in the embodiment of Figs. 1 through 3 of the drawings conduction fields will be generated between the operative faces of electrodes 63 and 55 and between the operative faces of electrodes 63 and 61, when the conductivity cell is operating.

I claim:

1. A conductivity cell including a housing formed of electrical conductive material and an electrode supporting means projecting from one end thereof, a pair of ground electrodes spacedly mounted on said means and in electrical contact therewith and said means being in electrical contact with the housing and an electrically charged electrode supported on and insulated from said means intermediate said ground electrodes and provided with operative generating faces, one face being directed toward each ground electrode for generating a conduction field therebetween, said electrodes adapted to be immersed in a solution to be tested and further means connecting said electrodes into an electric circuit.

2. A conductivity cell including as an integral unit a housing having an electrode forming forward wall, an electrode supporting means projecting from said forward wall and having an electrode formed on the forward end thereof, and an electrically charged electrode supported on said means in spaced relation with respect to said first named electrodes, an insulating element insulating said electrically charged electrode from said means, and said electrodes adapted to be immersed in a solution to be tested and further means connecting said electrodes into an electric circuit.

3. A conductivity cell in accordance with claim 2 wherein said insulating element ensheathes in sealed relation an electric lead extending between said electrode forming forward wall and said electrically charged electrode and in electric contact with the latter.

4. A conductivity cell including in combination, a housing member, an electrically charged electrode, ground electrodes integrally formed with said housing member, means for supporting said electrically charged electrode, and a compensator unit including a casing and a compensator positioned therein, said casing being formed of a material having a heat transfer characteristic and being dimensioned for a sliding fit within said housing member for removal therefrom, said electrodes adapted to be immersed in a solution under test and means for connecting said electrodes and compensator into an electric circuit.

References Cited in the file of this patent

UNITED STATES PATENTS

| | | |
|---|---|---|
| 1,807,821 | Behr | June 2, 1931 |
| 1,959,415 | Engle et al. | May 22, 1934 |
| 2,328,853 | Sherrard | Sept. 7, 1943 |
| 2,367,465 | Kunzer | Jan. 16, 1945 |
| 2,470,153 | Feller | May 17, 1949 |
| 2,505,936 | Behn | May 2, 1950 |
| 2,560,209 | Borell et al. | July 10, 1951 |
| 2,586,169 | Kline | Feb. 19, 1952 |
| 2,611,007 | Cade et al. | Sept. 16, 1952 |
| 2,616,949 | Cade | Nov. 4, 1952 |
| 2,654,862 | Petersen | Oct. 6, 1953 |